Figure 1:
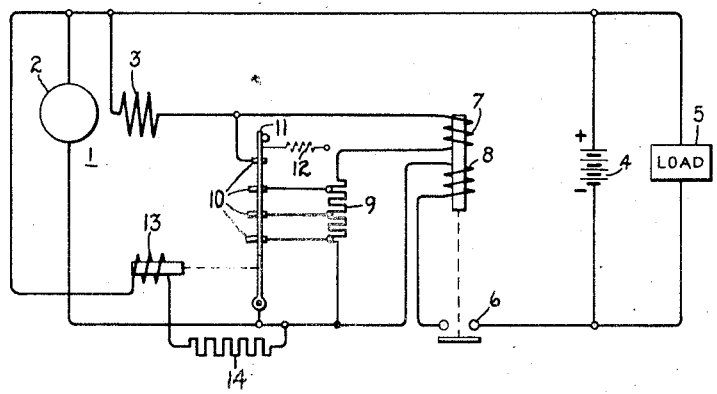

June 19, 1945.  J. L. STRATTON  2,378,807

ELECTRIC CIRCUIT

Filed Dec. 11, 1943

Inventor:
Jerry L. Stratton,
by Harry E. Dunham
His Attorney.

Patented June 19, 1945

2,378,807

UNITED STATES PATENT OFFICE 2,378,807

ELECTRIC CIRCUIT

Jerry L. Stratton, Schenectady, N. Y., assignor to General Electric Company, a corporation of New York Application December 11, 1943, Serial No. 513,935

5 Claims. (Cl. 320—28)

This invention relates to electric circuits and more particularly to improvements in reverse current relay circuits.

Reverse current relays are usually used to control the interconnection of a variable voltage source of current supply and a load having a counter-voltage, a typical application being between a variable speed-driven direct-current generator and a storage battery which is charged thereby. Such a relay is provided with a coil which responds to the generator voltage and which is so proportioned as to close the relay contacts and connect the generator to the battery whenever the generator voltage rises to equality with the battery voltage. A series or current coil is also usually provided so as to increase the sensitivity of the device and make it drop out and open its contacts upon a very slight drop in generator voltage below that of the battery voltage. Thus, so long as charging current flows, the current coil reenforces the potential coil and holds the contacts firmly, whereas as soon as the generator voltage falls below the battery voltage the battery discharges and the reverse current in flowing through the current coil causes it to counteract the potential coil so as to cause the relay to open its contacts. The net difference in ampere turns of the relay between closing and opening is the amount due to the change in generator voltage plus that produced by the reverse current. Since it is desirable to keep the voltage differential as well as the reverse current to a minimum, only a small percentage of the relay operating force is available to operate the contacts.

In accordance with this invention the force available for operating the reverse current relay contacts is materially increased without in any way sacrificing sensitivity of the relay, or, in other words, the sensitivity is increased materially for the same operating force by providing means which causes the voltage of the potential coil to vary in more than direct proportion to variations in generator voltage; in other words, the percentage change in generator voltage is amplified so far as the potential coil is concerned.

An object of the invention is to provide a new and improved electric circuit.

Another object of the invention is to provide a new and improved reverse current relay circuit.

Another object of the invention is to increase the operating force of reverse current relays.

An additional object of the invention is to increase the sensitivity of reverse current relays.

The invention will be better understood from the following description taken in connection with the accompanying drawing and its scope will be pointed out in the appended claims.

Figure 2:
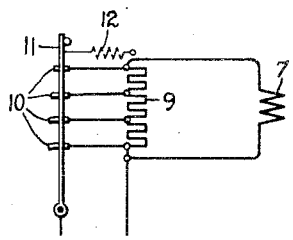

In the drawing Fig. 1 illustrates diagrammatically an embodiment of the invention and Fig. 2 is a detailed showing of a modification.

Referring now to the drawing and more particularly to Fig. 1, there is shown therein a direct-current generator 1 having a variable speed-driven armature 2 and a shunt field winding 3. The load on the generator is shown as a storage battery 4 and any additional load device or devices 5 may be connected in parallel with the battery. The connections between the generator and its load are controlled by a reverse current relay having a set of contacts 6 which are normally open and which are closed by the action of a potential coil 7. The action of the potential coil is re-enforced by a current coil 8 when the direction of current flow is such as to charge the storage battery, whereas when the current reverses the current coil 8 opposes the potential coil 7 and causes the reverse current relay to drop out and open its contacts.

The generator is provided with an automatic voltage regulator consisting of a resistor 9 provided with a plurality of taps. In addition, there are a plurality of contacts 10 which are short circuited by a pivotally mounted conducting member 11 which is held in short circuiting position by a spring 12. The member 11 is magnetically attracted by an operating coil 13 which is connected across the generator armature through a swamping resistor 14. The potential coil 7 and the resistor 9 are connected in series with each other and in series with the shunt field winding 3 of the generator. The taps of the resistor 9 are connected to the contacts of the regulator except that the potential coil 7 is connected between the two uppermost contacts 10 so that, in effect, the potential coil 7 acts as the first section of the regulating resistance.

The operation of Fig. 1 is as follows: The parts are illustrated in the positions they assume when the generator armature is at rest and is producing no voltage. Assume now that the armature is being accelerated up to its normal speed. This will cause the generator to build up voltage by reason of its residual magnetism and as all the field resistance is short circuited the voltage will build up relatively rapidly. When the generator voltage reaches its normal value, which is slightly higher than the battery voltage, the pull of the main operating coil 13 will overcome the counterpull of the spring 12 and move the contact bar 11 out of engagement with the top regulator contact, thus opening the short circuit about the potential coil 7. Consequently, the potential coil will go from a condition of zero voltage to a condition of substantial voltage immediately. This will cause the reverse current relay to close its contacts. If the generator voltage continues to rise the pull of the coil 13 becomes progresively stronger so as to move the member 11 successively out of the engagement of the fixed contacts, thereby successively un-short circuiting the sections of resistor 9. The resistances in series with the potential coil increase faster than the voltage applied to its circuit but the action of the current coil 8 under the influence of charging current prevents the reverse current relay from dropping out.

Consequently, the reverse current relay can be set very accurately to open its contacts at the desired value of voltage and there will be ample power to cause contact operation at exactly this value of voltage because of the fact that the potential coil voltage increases so rapidly relative to the increase in generator voltage.

In a like manner, when the generator voltage decreases, as will be the case when its speed drops too low, the action of the voltage regulator in decreasing the resistance in the field circuit in its attempt to hold up the generator voltage will cause the voltage of the potential coil 7 to decrease faster or in more than direct proportion to the decrease in generator voltage so that this amplified reduction in voltage applied to the potential coil will permit the reverse current relay to drop out at a smaller value of reverse current than heretofore.

In the modification shown in Fig. 2 the potential coil 7 is connected across or in parallel circuit relation with the resistor 9. Consequently, it is short circuited before the regulator comes into action during such times as the generator voltage is substantially below its normal value which is similar to the condition of the potential coil in Fig. 1 under these conditions. As the generator voltage increases and the action of the regulator commences the successive un-short circuiting of the sections of the resistor 9 will cause the voltage across the potential coil 7 to increase by a greater percentage than increases in generator voltage. Similarly, when the generator voltage decreases, the percentage decrease in voltage of the potential coil will be greater than the percentage decrease in generator voltage by reason of the progressive short circuiting of the sections of the resistor 9 by the regulator.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In combination, a source of variable voltage direct current, a load, means including a reverse current relay for interconnecting said source and load, said relay having a potential coil normally connected to respond to the voltage of said source, and means for causing given percentage changes in source voltage to produce substantially greater percentage changes of the same direction in potential coil voltage.

2. In combination, a direct-current generator, a load having a counter-voltage, means including a reverse current relay for interconnecting said generator and said load, said relay having a series-connected current coil and a potential coil, an automatic voltage regulator for said generator, and interconnections between said regulator and potential coil for varying the voltage of said potential coil in more than direct proportion to variations in generator voltage.

3. In combination, a variable speed-driven direct-current generator, a storage battery, a reverse current relay for interconnecting said generator and battery, a potential coil on said relay, an automatic rheostatic type voltage regulator for said generator, and connections for causing said regulator to produce amplified voltage changes of said potential coil in the same direction as the changes in voltage of said generator.

4. In combination, a variable speed-driven direct-current generator, a storage battery, a reverse current relay for interconnecting said generator and battery, a potential coil on said relay, a shunt field circuit for said generator, a resistor, said potential coil and resistor being serially connected in said field circuit, means for short circuiting said potential coil and resistor, and means responsive to an increase in generator voltage above a given value for first removing the short circuit of said potential coil and then progressively un-short circuiting said resistor.

5. In combination, a variable speed-driven direct-current generator, a storage battery, a reverse current relay for interconnecting said generator and battery, a potential coil on said relay, a shunt field circuit for said generator, a resistor serially connected in said winding circuit, means for short circuiting said resistor, means responsive to an increase in generator voltage above a given value for progressively un-short circuiting said resistor, and means for connecting said potential coil in shunt circuit relation to said resistor.

JERRY L. STRATTON.